US006982508B2

(12) United States Patent
Kumagai

(10) Patent No.: US 6,982,508 B2
(45) Date of Patent: Jan. 3, 2006

(54) AUTOMOTIVE ALTERNATOR HAVING RECTIFIER AND VOLTAGE REGULATOR MOUNTED THEREON

(75) Inventor: Satoshi Kumagai, Toyokawa (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 10/772,384

(22) Filed: Feb. 6, 2004

(65) Prior Publication Data

US 2004/0217663 A1 Nov. 4, 2004

(30) Foreign Application Priority Data

Feb. 28, 2003 (JP) ............................ 2003-053686

(51) Int. Cl.
*H02K 11/00* (2006.01)
*H02M 1/00* (2006.01)

(52) U.S. Cl. ...................... 310/71; 310/68 D; 363/145

(58) Field of Classification Search .................. 322/28; 310/68 D, 71, 239, 67 R, 68 R, 64; 28/598, 28/597; 363/145, 144, 154
See application file for complete search history.

(56) References Cited

U.S. PATENT DOCUMENTS 4,870,308 A * 9/1989 Sismour, Jr. ................ 310/71
4,952,829 A 8/1990 Armbruster et al.
5,013,948 A * 5/1991 Tumpey et al. ........... 310/68 D
5,659,212 A * 8/1997 DePetris .................. 310/68 D
5,705,867 A * 1/1998 Jeon ........................ 310/68 C
6,060,802 A 5/2000 Masegi et al.
6,064,026 A 5/2000 Tkazyik et al.
6,617,723 B1 * 9/2003 Shichijyo ..................... 310/71
2001/0010436 A1 8/2001 Ballard et al.
2002/0043882 A1 * 4/2002 Tanaka et al. ................ 310/71
2002/0050750 A1 * 5/2002 Oohashi et al. ........... 310/68 D

FOREIGN PATENT DOCUMENTS

FR 2 566 971 1/1986
WO WO 02/069396 A2 9/2002

* cited by examiner

*Primary Examiner*—Darren Schuberg
*Assistant Examiner*—Julio Gonzalez
(74) *Attorney, Agent, or Firm*—Oliff & Berridge, PLC

(57) ABSTRACT

A phase terminal for taking out a phase voltage from armature windings is electrically connected to a detector terminal extending from a voltage regulator. The phase terminal is sandwiched by the detector terminal bent in a U-shape and welded thereto by resistance welding. To suppress current bypassing a welding position in the resistance welding process, a slit window is formed in the U-shaped portion. Since electrical resistance in the U-shaped portion is increased by the slit window, a sufficient amount of welding current becomes available for welding the phase terminal to the detector terminal.

7 Claims, 4 Drawing Sheets

AUTOMOTIVE ALTERNATOR HAVING RECTIFIER AND VOLTAGE REGULATOR MOUNTED THEREON

CROSS-REFERENCE TO RELATED APPLICATION

This application is based upon and claims benefit of priority of Japanese Patent Application No. 2003-53686 filed on Feb. 28, 2003, the content of which is incorporated herein by reference.

BACKGROUND OF THE INVENTION

1. Field of the Invention

The present invention relates to an alternator for use in an automotive vehicle.

2. Description of Related Art

An alternator having a phase terminal sandwiched by a detector terminal led out from a voltage regulator is shown in JP-A-11-164518. The phase terminal extending from a terminal base of a rectifier is electrically connected to the detector terminal by resistance welding. If the detector terminal is made of a material having a relatively high electrical resistance, such as a nickel-plated iron plate, the phase terminal sandwiched by the detector terminal can be welded to the detector terminal without difficulty. This is because most of the welding current flows through the phase terminal sandwiched by the detector terminal without bypassing a welding portion.

However, if the detector terminal is made of a material having a high electrical conductivity such as a tin-plated brass, an amount of current flowing through the bent portion of the detector terminal will increase, and thereby an amount of welding current flowing through the phase terminal will decrease. Therefore, there occurs a problem that the phase terminal cannot be well connected to the detector terminal by resistance welding.

SUMMARY OF THE INVENTION

The present invention has been made in view of the above-mentioned problem, and an object of the present invention is to provide an improved structure of the detector terminal with which the phase terminal is sandwiched. By employing the improved structure in the alternator, the phase terminal can be well connected to the detector terminal, not depending on a material of the detector terminal.

The automotive alternator includes an armature having multi-phase windings and a rotor for providing a magnetic field for the armature. Alternating current generated in the armature is rectified into direct current by a rectifier, and output voltage of the armature is controlled to a predetermined level by a voltage regulator. The rectifier and the regulator are mounted on the alternator.

A phase terminal for taking out a phase voltage from one of the phase windings extends from the rectifier, while a detector terminal to be connected to the phase terminal extends from the voltage regulator. The detector terminal is bent in a U-shape, thereby forming a first portion, a second portion positioned in parallel to the first portion and a U-shaped portion positioned between the first and the second portions. The phase terminal is sandwiched between the first and the second portions and welded thereto by resistance welding.

In order to suppress bypassing current flowing through the U-shaped portion in the resistance welding process, a slit window is formed in the U-shaped portion. Since the electrical resistance in the U-shaped portion is increased by the slit window, the bypassing current is suppressed and a sufficient amount of welding current flows through the phase terminal. Accordingly, the phase terminal is surely connected to the detector terminal by the resistance welding without depending on a material, i.e., electrical resistance, forming the detector terminal.

The position of the slit window is not limited to the U-shaped portion, but the slit window may be positioned at other places as long as the slit window suppresses the bypassing current in the resistance welding process. The detector terminal may be made by laminating two or more thin plates. Other objects and features of the present invention will become more readily apparent from a better understanding of the preferred embodiment described below with reference to the following drawings.

DETAILED DESCRIPTION OF THE PREFERRED EMBODIMENT

Figure 1:
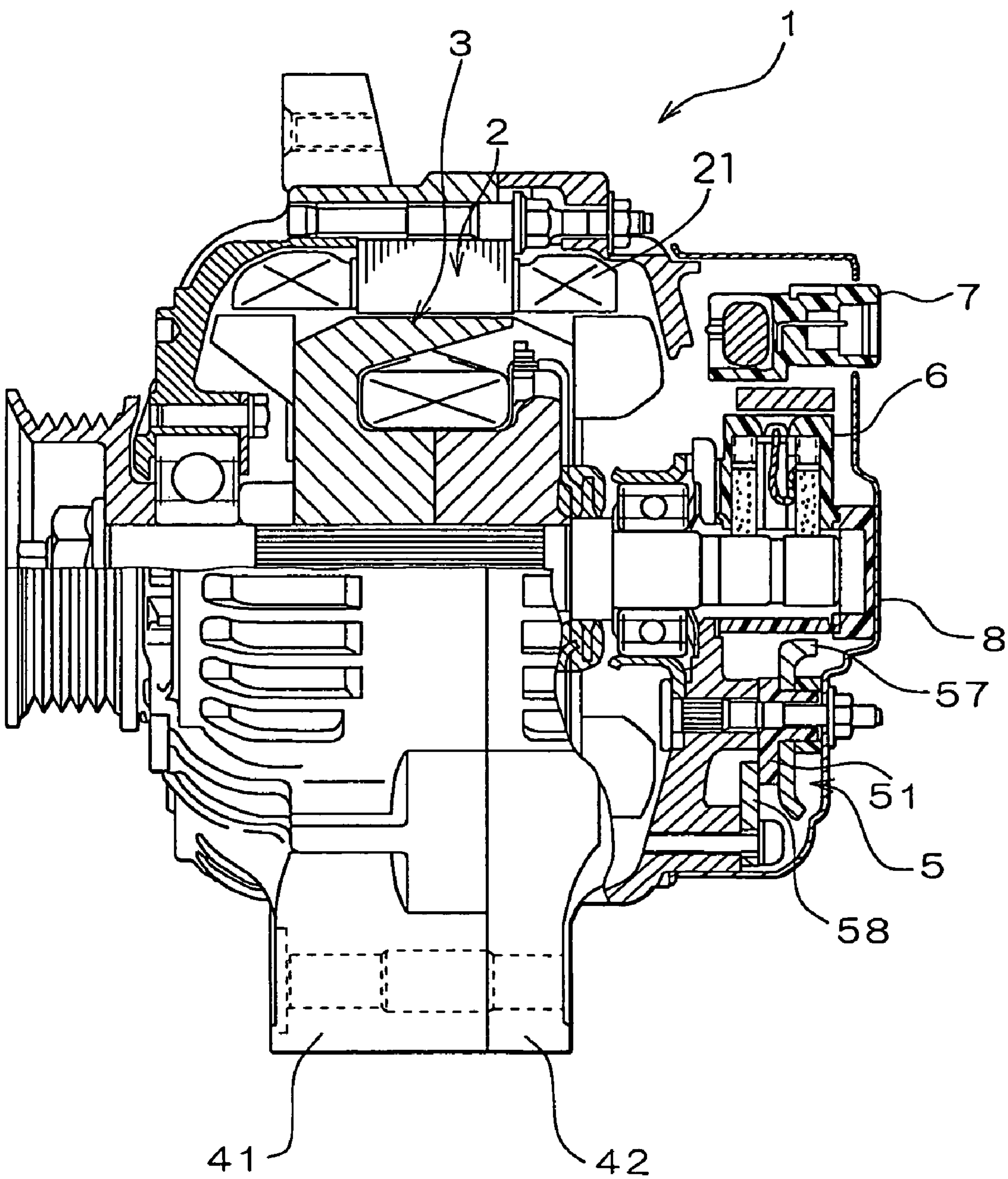
FIG. 1 is a cross-sectional view showing an alternator for use in an automotive vehicle.

A preferred embodiment of the present invention will be described with reference to accompanying drawings. An alternator 1 for use in an automotive vehicle is composed of: an armature 2, a rotor 3, a front frame 41, a rear frame 42, a rectifier 5, a brush device 6, a voltage regulator 7, and other associated components. The armature 2 is fixed between the front frame 41 and rear frame 42, and the rotor 3 is rotatably supported by the two frames 41, 42. The rear axial end of the alternator 1 is covered with a rear cover 8.

Excitation current is supplied to a field coil wound on the rotor 3 from the brush device 6 through slip rings connected to a rotor shaft. Alternating current generated in the armature 2 is rectified into direct current by the rectifier 5, and output voltage generated in the alternator 1 is controlled to a predetermined level by the voltage regulator 7.

Figure 2:
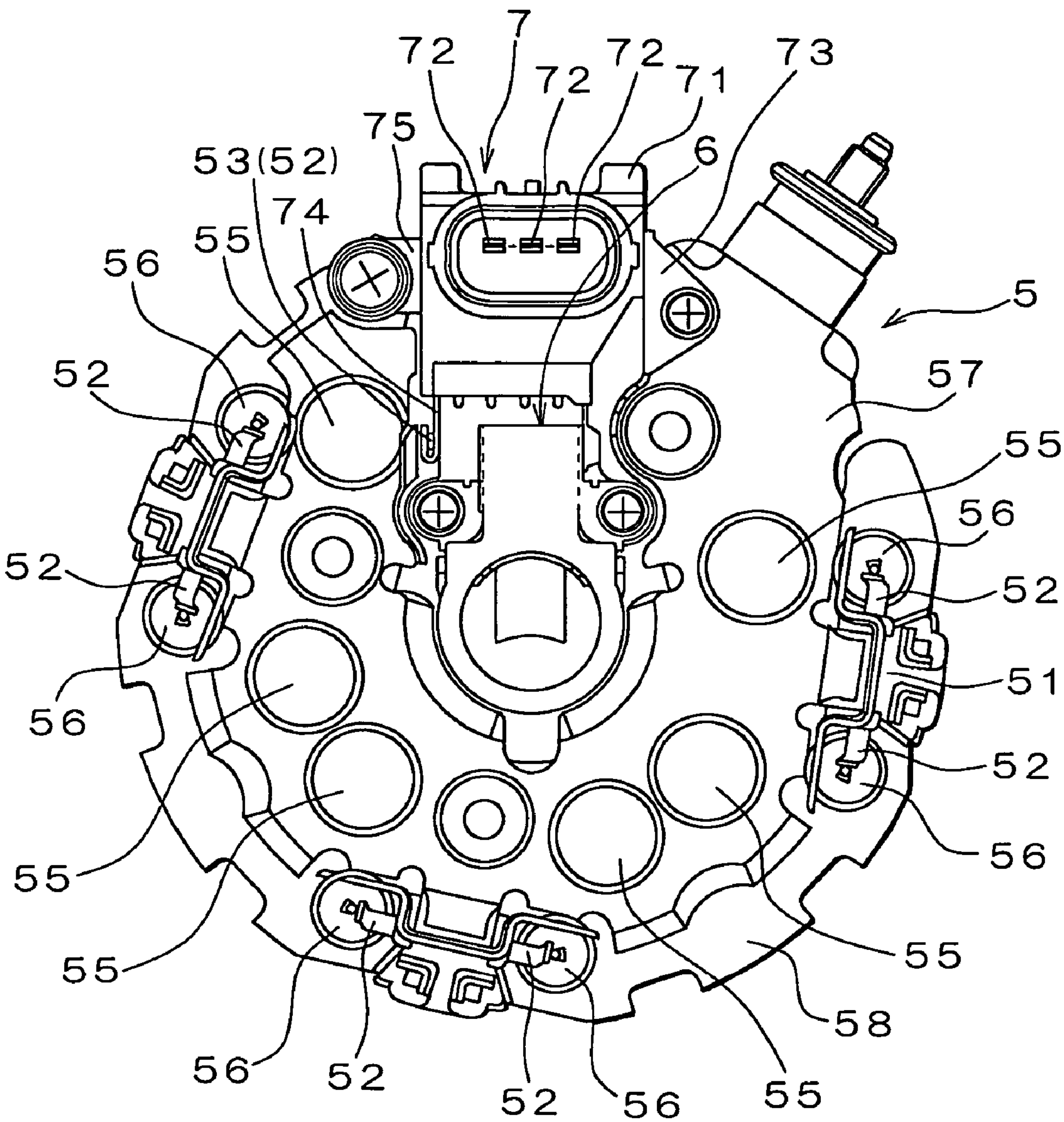
FIG. 2 is a plan view showing a rectifier with a voltage regulator and a brush device mounted thereon, viewed from an axial rear end of the alternator with a rear cover removed.

Referring to FIG. 2 showing the rectifier 5 and brush device 6 and the voltage regulator 7 mounted on the rectifier, a structure of a detector terminal 74 extending from the regulator 7 and a phase terminal 53 led out from the rectifier 5 will be described. The rectifier 5 is composed of a plus terminal heatsink plate 57, a minus terminal heatsink plate 58, and a terminal base 51 interposed between two heatsink plates 57, 58. Both heatsink plates 57, 58 and the terminal base 51 is laminated in the axial direction as better seen in FIG. 1.

Six holes are formed on the plus heatsink plate 57, and plus rectifier elements 55 are fixed to respective holes. Similarly, six holes are formed on the minus heatsink plate 58, and minus rectifier elements 56 are fixed to respective holes. The terminal base 51 includes plural connecting terminals 52 molded together by insert-molding. A phase terminal 53 for leading a phase voltage from a three-phase winding of the armature 2 is included in the connecting terminals 52.

The voltage regulator 7 includes a connector case 71. The connector case 71 is fixed to the plus terminal heatsink plate 57 with screws via a mounting arm 73. A terminal arm 75 is fixed to the rear frame 42 with a screw together with the minus heatsink plate 58. The connector case 71 has connector terminals 72 for communicating with an electronic control unit of the vehicle and a detector terminal 74 led out from the connector case 71. Those terminals 72, 74 are molded together with the connector case 71 by insert-molding. The detector terminal 74 is electrically connected to the phase terminal 53 by resistance welding. Frequencies of the phase voltage appearing at the phase terminal 53 and the phase voltage itself are led to the voltage regulator 7 through the detector terminal 74. The voltage regulator 7 controls an amount of current supplied to the field coil of the rotor 3 based on the signals fed from the detector terminal 74. Information including rotational speed of the rotor 3 and a level of the generated voltage in the alternator 1 is sent out to the electronic control unit from the connector terminals 72.

Figure 3:
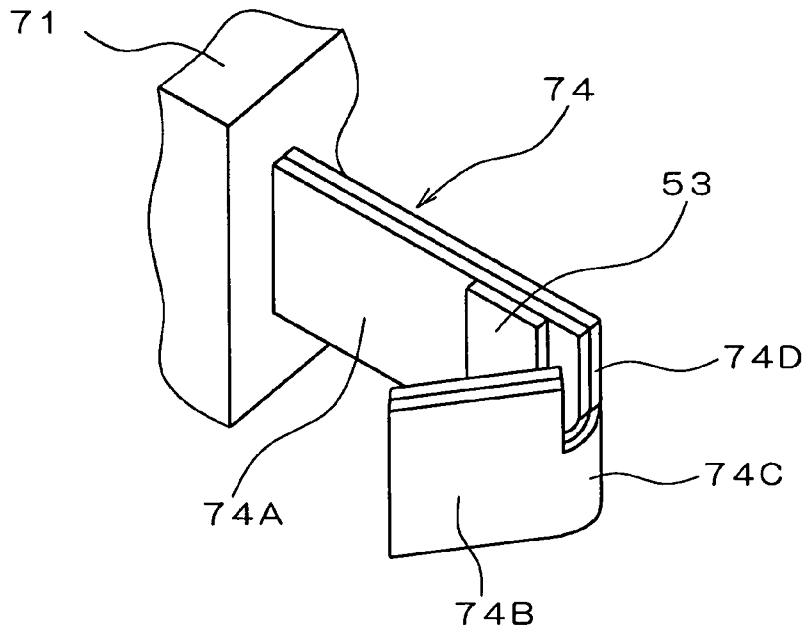
FIG. 3 is a perspective view showing a detector terminal to which a phase terminal is connected.
Figure 4:
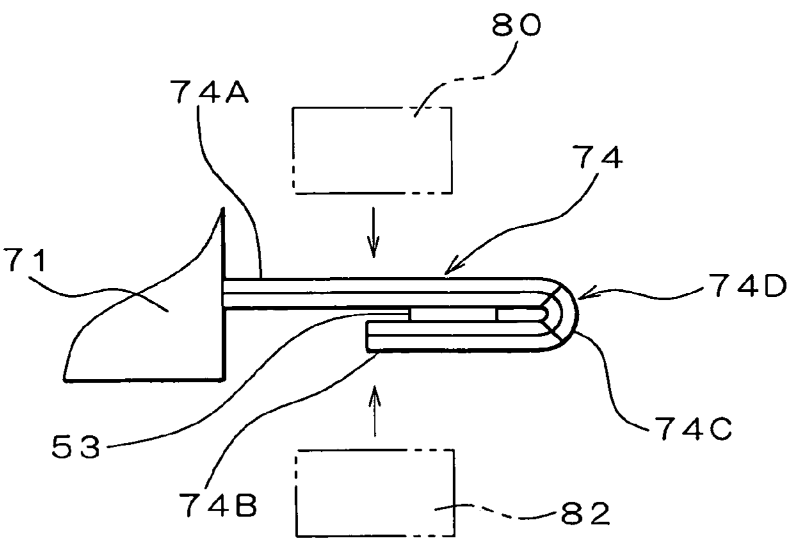
FIG. 4 is a plan view showing the detector terminal and the phase terminal connected to the detector terminal, viewed from the axial rear end of the alternator.

The structure for electrically connecting the phase terminal 53 to the detector terminal 74 will be described in detail with reference to FIGS. 3–5. As shown in FIG. 3, the detector terminal 74 extending from the connector case 71 is formed by bending laminated two plates into a U-shape. Thus, the detector terminal 74 is composed of a first portion 74A, a second portion 74B and a U-shaped portion 74C. A slit window 74D is formed in the U-shaped portion. As shown in FIG. 4, the phase terminal 53 is sandwiched between the first portion 74A and the second portion 74B. A pair of welding electrodes 80, 82 are attached to both sides of the detector terminal 74, and the phase terminal 53 is electrically connected to the detector terminal 74 by resistance welding.

Figure 5:
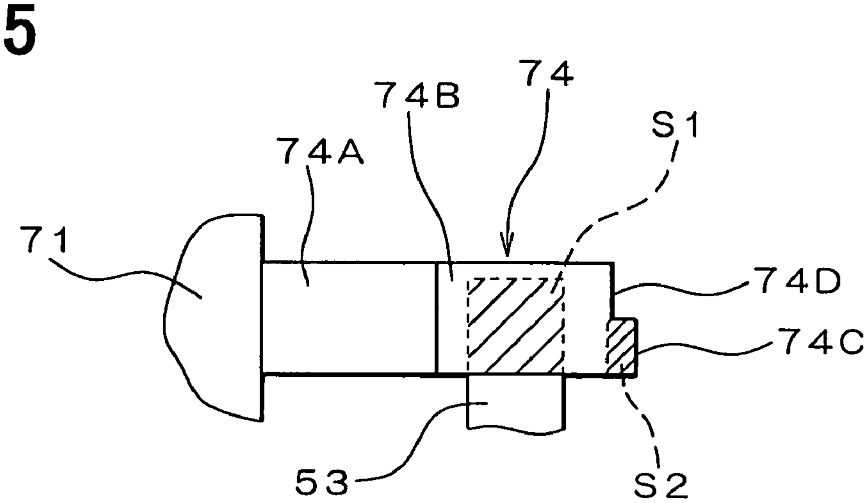
FIG. 5 is a side view showing the detector terminal and the phase terminal, a slit window being formed in a U-shaped portion.

As shown in FIG. 5, a cross-sectional area S2 of the U-shaped portion 74C is made much smaller than an area S1 where the phase terminal 53 contacts the detector terminal 74. The cross-sectional area S2 is made smaller by making the slit window 74D. The welding current flowing through the first portion 74A, the phase terminal 53 and the second portion 74B can be made sufficiently large by suppressing current flowing through the U-shaped portion, i.e., the cross-sectional area S2. Thus, the phase terminal 53 is well welded to the detector terminal 74.

In this particular embodiment, the detector terminal 74 is made by laminating two tin-plated brass plates which have a lower electrical resistance than nickel-plated ferrous material. Forming the detector terminal 74 by laminating thin plates, the slit window 74D can be easily made by stamping. The thin plate may be made common to other terminal plates used in the voltage regulator 7 or the rectifier 5, and thus, the manufacturing costs can be reduced.

Since the bypassing current flowing through the U-shaped portion 74C in the resistance welding process is suppressed by forming the slit window 74D, the resistance welding can be successfully performed even when the detector terminal 74 is made of a material having a low electrical resistance. If the tin-plated brass plate is used as in the present embodiment and if no slit window 74D is formed as in the conventional device, the bypass current flowing through the U-shaped portion will become too large. Therefore, it will be difficult to successfully weld the phase terminal 53 to the detector terminal 74 by resistance welding. By making the slit window 74D in the U-shaped portion 74C, the resistance welding can be successfully performed irrespective of the material forming the detector terminal 74. In addition, by making the slit window 74D in the U-shaped portion 74C, the process of bending, i.e., the process of forming the U-shaped portion, can be easily carried out.

Figure 6:
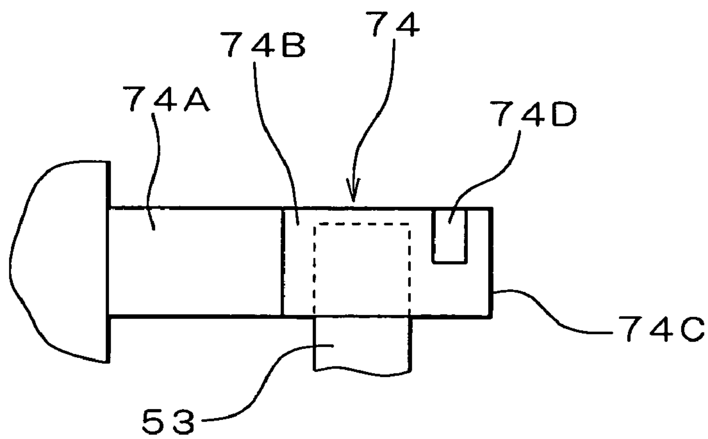
FIG. 6 is a side view showing the detector terminal and the phase terminal, a slit window being formed in a second portion of the detector terminal.
Figure 7:
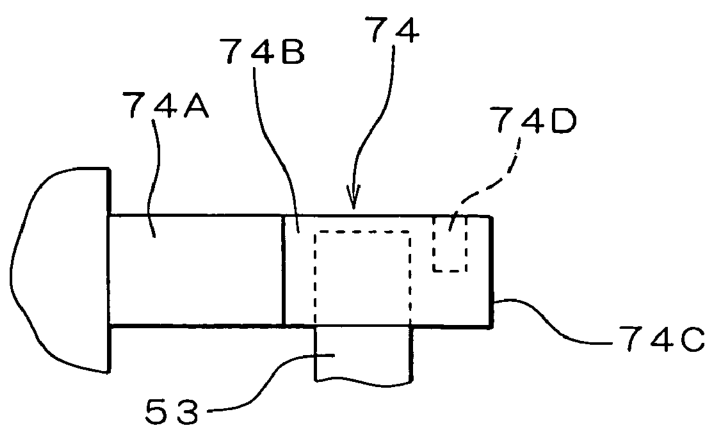
FIG. 7 is a side view showing the detector terminal and the phase terminal, a slit window being formed in a first portion of the detector terminal.

The present invention is not limited to the foregoing embodiment, but it may be variously modified. For example, the slit window 74D may be formed on the second portion 74B of the detector terminal 74, as shown in FIG. 6. Alternatively, the slit window 74D may be formed on the first portion 74A of the detector terminal 74, as shown in FIG. 7. The positions of the slit window 74D are not limited to the examples shown above, it may be made at other places as long as it suppresses the bypassing current at the resistance welding. Further, the number of the slit windows 74D is not limited to one, but more than two slit windows may be formed. For example, one slit window may be made on each of the first portion 74A and the second portion 74B.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An alternator for use in an automotive vehicle, the alternator comprising:

an armature having multi-phase windings generating alternating current therein;

a rectifier having a plurality of rectifier elements for rectifying the alternating current into direct current and a phase terminal connected to one of the multi-phase windings, the phase terminal extending from the rectifier; and a voltage regulator for controlling voltage generated in the armature, the voltage regulator including a detector terminal connected to the phase terminal, wherein:

the detector terminal is bent in a U-shape thereby forming a first portion extending from the voltage regulator, a second portion positioned in parallel to the first portion, and a U-shaped portion positioned between the first and the second portions;

the phase terminal is sandwiched between the first and the second portions of the detector terminal and is welded to the detector terminal by resistance welding; and a slit window is formed in the detector terminal, so that an amount of current, bypassing the phase terminal, flowing through the first portion, the U-shaped portion and the second portion in a process of the resistance welding is suppressed by the slit window.

2. The alternator as in claim 1, wherein:

the slit window is formed in the U-shaped portion of the detector terminal.

3. The alternator as in claim 1, wherein:

the slit window is formed in the first portion of the detector terminal.

4. The alternator as in claim 1, wherein:

the slit window is formed in the second portion of the detector terminal.

5. The alternator as in claim 1, wherein:

a contacting area of the phase terminal to the detector terminal is larger than a cross-sectional area of the detector terminal at a position where the slit window is located.

6. The alternator as in claim 1, wherein:

the detector terminal is formed by laminating a plurality of plates.

7. The alternator as in claim 1, wherein:

the detector terminal is made of a material having an electrical resistance lower than that of a ferrous material.

* * * * *